United States Patent [19]

Stout

[11] 4,058,727
[45] Nov. 15, 1977

[54] GAMMA CAMERA WITH REFLECTIVITY MASK

[75] Inventor: Karl J. Stout, Hudson, Mass.

[73] Assignee: Raytheon Company, Lexington, Mass.

[21] Appl. No.: 700,283

[22] Filed: June 28, 1976

[51] Int. Cl.² .............................................. G01T 1/20
[52] U.S. Cl. ............................. 250/363 R; 250/366; 250/369
[58] Field of Search .................... 250/363 S, 366, 369, 250/363

[56] References Cited

U.S. PATENT DOCUMENTS

| | | |
|---|---|---|
| 3,784,819 | 1/1974 | Martone et al. .................. 250/363 S |
| 3,859,531 | 1/1975 | Van Dijk .......................... 250/363 S |
| Re. 28,451 | 6/1975 | Spleha ............................. 250/363 S |
| Re. 28,571 | 10/1975 | Lange .................................... 250/366 |

*Primary Examiner*—Harold A. Dixon
*Attorney, Agent, or Firm*—David M. Warren; Joseph D. Pannone; Milton D. Bartlett

[57] ABSTRACT

A gamma camera with a plurality of photodetectors arranged for locating flashes of light produced by a scintillator in response to incident radiation. Masking material is arranged in a radially symmetric pattern on the front face of the scintillator about the axis of each photodetector to reduce the amount of internal reflection of optical photons induced by gamma ray photons.

8 Claims, 9 Drawing Figures

GAMMA CAMERA WITH REFLECTIVITY MASK

BACKGROUND OF THE INVENTION

Radiographic cameras utilized in providing an image of a radioactive subject are frequently composed of a scintillator crystal and a collimator for guiding radiant energy from the subject to the scintillator crystal. An array of photodetectors, such as photomuliplier tubes, face the scintillator for detecting scintillations. The collimators may be in the form of a parallel tube collimator, converging on diverging tube collimators or a pinhole aperture. In response to high energy radiations, such as gamma radiation or X-radiation emitted by the subject, the collimator produces an image of the subject upon the scintillator. Each high energy photon, such as a gamma photon, produces a scintillation in the form of a multiplicity of optical photons in the vicinity of the point of impact of the gamma photon within the scintillator. The points of impact of the gamma photons delineate the image of the subject. The optical photons are subject to internal reflection from the front face of the scintillator which faces the subject and, accordingly, the photodetectors which face the back face of the scintillator are responsive to both directly radiated and reflected optical photons. A transparent spacer, or light pipe, positioned between the scintillator and the photodetectors serves as an impedance match for the optical photons so that substantially all of the optical photons radiated through the back face of the scintillator impinge upon the photodetectors. The signals of the photodetectors are combined in a manner such as that taught in the U.S. Pat. No. 3,914,611 which issued to K. J. Stout on Oct. 21, 1975, the amplitudes of the signals of the photodetectors being weighted and summed to provide X and Y coordinate signals representing the positions of the points of incidence of the gamma photons upon the scintillator. The X and Y deflection signals are utilized to drive a display for showing an image of the subject.

A problem arises in that the image shown on the display should have the characteristics of both linearity and resolution, the linearity providing a minumum of distortion while the resolution insures that small, closely spaced, points of the subject can be distinguished in the displayed image. Heretofore, there has been a compromise in the design of radiographic cameras in that the photodetectors may be placed close to the scintillator to provide high resolution at the expense of linearity, or alternatively, the photodetectors may be placed further away from the scintillator to provide improved linearity with a loss of resolution.

SUMMARY OF THE INVENTION

The aforementioned problem is overcome and other advantages are provided by a radiographic camera comprising an array of photodetectors facing the back face of a scintillator and including circuitry for combining the signals of the photodetectors to produce an image of a subject emitting high energy radiation towards the scintillator. The scintillator is typically formed of a crystal of optically transparent material having scintillation characteristics such as sodium iodide. A face of the crystal may be finished to provide for internal reflection of light, or optical photons, or may be finished to provide for the transmission of light therethrough. In accordance with the invention, the front face of a scintillator having internal reflection, the front face facing the subject emitting the high energy radiation, is treated to alter the amount of internal reflectivity in a region of predetermined shape, this being referred to as a masked region.

In one embodiment of the invention, the front face is treated by applying a nonreflective coating in the form of a mask having a pattern which is radially symmetric about the axis of an individual photodetector, the mask pattern being repeated for each of the photodetectors. The scintillator crystal provides for internal reflection from the front face of the scintillator of optical photons which are reflected back towards the photodetectors. The nonreflective coating of the mask reduces the amount of internal reflection at those points of the front face which are coated with the mask. Thereby, the response of an individual one of the photodetectors to the intensity of an incident high energy photon as a function of the relative positions of the photodetector and the point of impact of the high energy photon within the scintillator is altered. Furthermore, the weighted summation of the signals from the individual photodetectors is altered. In particular, the highly peaked response graph of photodetectors which are closely spaced to a scintillator is altered to provide a linearized weighted summation of detector signals which retains the high resolution capability of a camera in which the photodetectors are closely spaced to the scintillator.

In the case of a scintillator having a transmissive face, the invention provides for the application of a mask having a complimentary pattern so that the resulting arrangement of reflective and nonreflective regions is the same as that disclosed above.

BRIEF DESCRIPTION OF THE DRAWINGS

The aforementioned features and other advantages of the invention are explained in the following description taken in connection with the accompanying drawings wherein.

DESCRIPTION OF THE PREFERRED EMBODIMENT

Figure 1:
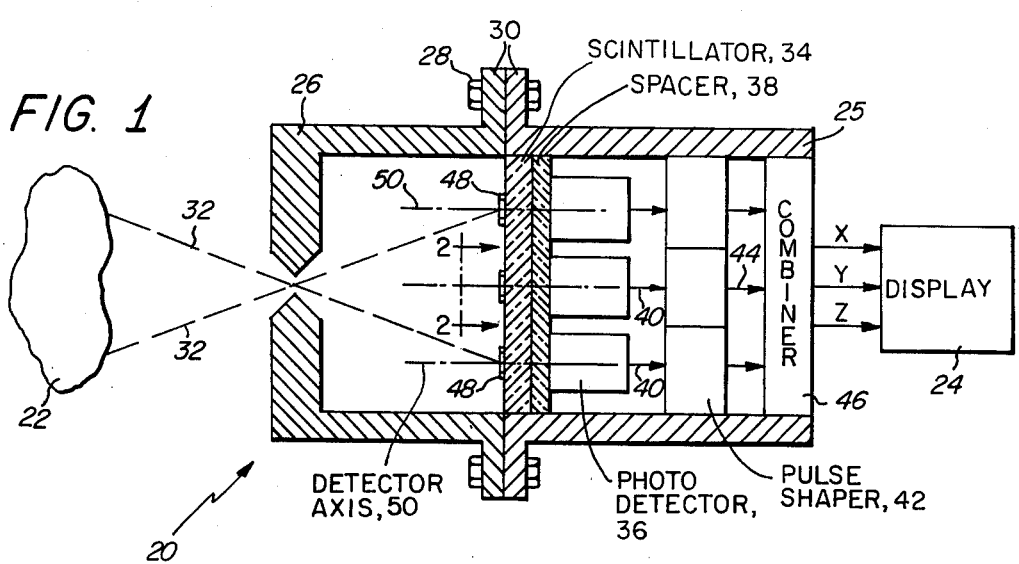
FIG. 1 is a sectional view of a radiographic camera showing an array of photodetectors facing a scintillator having, in accordance with the invention, a plurality of masks of a nonreflective coating positioned along the axes of the photodetectors on the face of the scintillator away from the photodetectors.

Referring now to FIG. 1, there is seen a radiographic camera 20 responsive to high energy radiation such as gamma or X-radiation emitted by a subject 22 for forming an image thereof on a display 24. The camera 20 includes a case 25 to which is affixed a pinhole aperture assembly 26 by bolts 28 on flanges 30. Rays 32 of energy emitted by the subject 22 pass through a pinhole aperture to impinge upon a scintillator 34, the rays 32 providing high energy photons which interact with the scintillator 34 to produce optical, or visible, photons which are received by photodetectors 36. While only three photodetectors 36 are shown, it is understood that many more photodetectors may be positioned in a hexagonal array as taught in the aforementioned Stout patent. A spacer 38 of optically transparent material provides an impedance match to the optical photons between the scintillator 34 and the photodetectors 36 so that the scintillations of optical photons are coupled from the scintillator 34 to the photodetectors 36. Output electrical signals produced by the photodetectors 36 are coupled via lines 40 to pulse shapers 42, and are further coupled via lines 44 to a combiner 46 to produce the X and Y coordinate signals and the Z axis signal for the display 24. The pulse shaper 42 includes circuitry such as that shown in FIG. 3 of the aforementioned Stout patent for converting the signals of the detectors into clearly defined pulses, the combiner 46 including a resistive summing circuit for weighting the values of the pulse signals as disclosed in FIG. 4 of the aforementioned Stout patent.

Figures 2, 3:
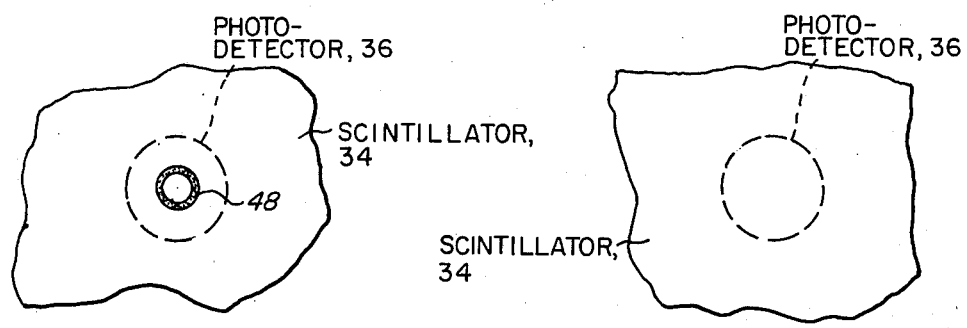
FIG. 2 is a plan view of a portion of the scintillator taken along the lines 2—2 of FIG. 1 showing one form of mask positioned along the axis of a photodetector.
FIG. 3 shows the scintillator of FIG. 2 with the mask removed.

Referring now to FIGS. 1 and 2, a masking of a nonreflective coating is applied, in accordance with the invention, to the front face of the scintillator 34, the front face facing the subject 22 while the back face of the scintillator 34 faces the photodetectors 36. As seen in the plan view of FIG. 2, the mask 48 has the form of an annulus, an axial sectional view of the mask 48 being seen in FIG. 1. The center of the annulus 48 is seen to lie on the axis 50 of the corresponding photodetector 36, the photodetector 36 being shown by a dashed circle in FIG. 2.

Figure 4:
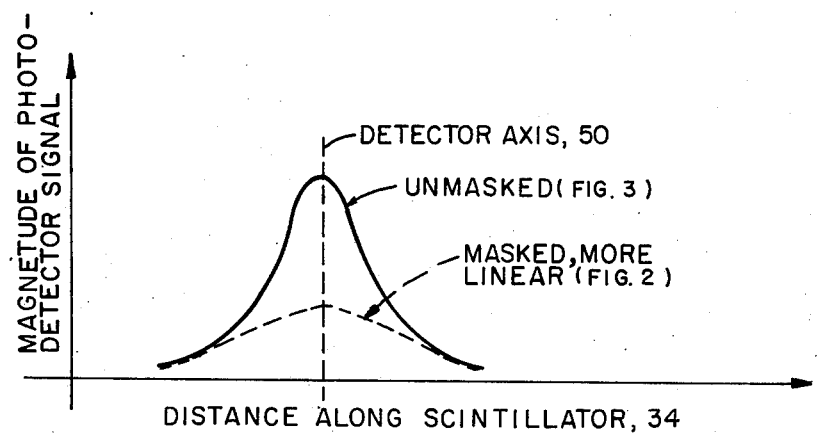
FIG. 4 shows graphs of the response of the photodetector of FIG. 2 both in the presence and absence of the mask of FIG. 2.

Referring to FIGS. 2, 3 and 4, the response of a photodetector 36 to a scintillation within the scintillator 34 will now be described. FIG. 3 is the same as FIG. 2 except for the lack of the mask 48. The graph of FIG. 4 shows the response curve for a photodetector 36 for the situation in FIG. 3 in which no masking of nonreflective coating is applied, and for the situation of FIG. 2 wherein the mask of nonreflective coating is applied. The solid graph representing the unmasked situation is seen to peak up sharply along the detector axes while for scintillations occurring in the scintillator at a distance from the axis 50, the response drops down rapidly. By way of comparison, the masking shown by the dashed graph, while reducing the peak of the detector response for scintillations in the vicinity of the axis 50, provides the aforementioned linear response, in accordance with the invention, wherein the magnitude of the weighted sum of the signals of the photodetectors 36 varies linearly with displacement of the scintillation from the axis 50. The resultant resolution and linearity are now further described with reference to FIGS. 5 and 6.

Figure 5:
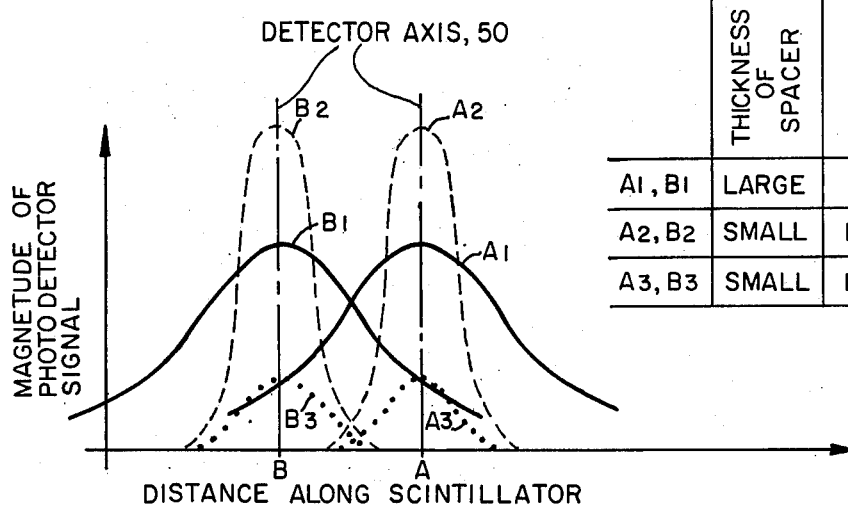
FIG. 5 shows graphs of the response of two photodetectors arranged side by side along a scintillator, three sets of graphs being shown, respectively, for a large spacing, a small spacing, and a small spacing between the photomultipliers and the scintillator, the latter case including the masking of the scintillator in accordance with the invention.

Referring now to FIG. 5, there are seen three graphs for each of two photodetectors 36 positioned side by side along the scintillator 34, one of these photodetectors being identified by the label A and the second by the label B. The three graphs are identified by the legends A1-A3 and B1-B3. The graphs A1 and B1 are drawn for the situation wherein the thickness of the spacer 38 of FIG. 1 is large providing a relatively low resolution but relatively high linearity, as shown in the table accompanying the graphs, for the situation of FIG. 3 wherein the masking is absent. The table of FIG. 5 also shows that the graphs A2 and B2 represent the response of the photodetectors for the situation wherein the thickness of the spacer 38 is relatively small, this providing a high resolution and a low linearity for the situation depicted in FIG. 3 wherein the masking is absent. The graphs A3 and B3 depict the situation of a camera incorporating the invention wherein the scintillator includes a mask 48 such as that of FIG. 2, or one of the alternative embodiments of masks to be disclosed subsequently with reference to FIGS. 7 and 8, the table of FIG. 5 showing that the thickness of the spacer 38 is relatively small while both the resolution and the linearity of the image produced on the display 24 are high.

Figure 6:
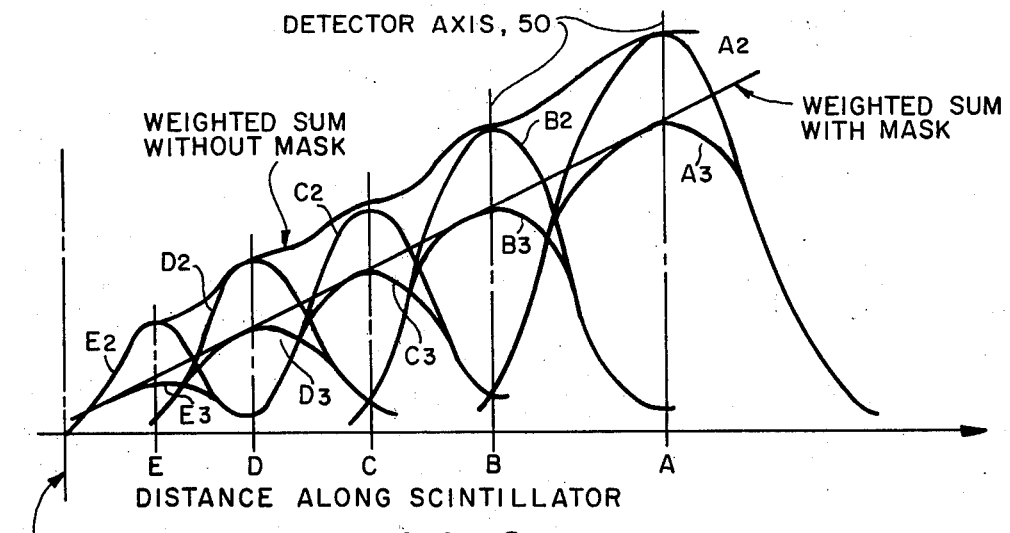
FIG. 6 is a graphical construction of the linearity of the weighted summation of detector signals.

The graphs of FIGS. 5 and 6 also present an explanation as to how the resolution and linearity can be simultaneously high. FIG. 6 shows a set of overlapping graphs representing the responses of a group of photodetectors set out side by side along a radius of a radiographic camera such as the camera 20 of FIG. 1. The centerline of the camera is at the left side of the Figure. As taught in the aforementioned Stout patent at FIG. 4 therein, a photodetector positioned at the centerline has a zero weighting applied to its signal, the weighting increasing linearly with distance from the centerline to provide an X or Y coordinate axis signal. The photodetectors 36 identified by the legends A and B in FIG. 5 appear also in FIG. 6 in which their respective responses are weighted in accordance with distance from the camera centerline. The graphs A2 and A3 of FIG. 6 correspond with the graphs A2 and A3 of FIG. 5. By way of illustration, FIG. 6 shows graphs for five photodetectors, A-E, the amplitudes of their respective signals decreasing with decreasing distance from the centerline in accordance with the aforementioned weighting. Individual ones of the graphs B2-E2 correspond to graph A2 and graphs B3-E3 correspond to graph A3. Also shown in FIG. 6 are the weighted summation of the photodetector signals in the absence of the masks on the front face of the scintillator, this being the sum of the graphs A2-E2, and the weighted summation of the photodetector signals in the presence of the masks on the front face of the scintillator, this being the sum of the graphs A3-E3, the latter summation having the increased linearity as taught by this invention.

With reference to the graphs A2 and B2, it is seen that the double peak presented by the two graphs is very sensitive to displacements of a scintillation in the vicinity of the axes A and B with the result that two scintillations, even though they be relatively closely spaced together, will result in substantially different magnitudes of output signals from the photodetectors A and B. In this way, a camera having the detectors closely spaced to the scintillator can resolve the differences in location of two closely spaced scintillations. On the other hand, it is noted that the graphs A2 and B2 are distinctly nonlinear with the result that an image of uniformly spaced apart scintillations would not have uniformly spaced apart image points.

The graphs A1 and B1 of FIG. 5 are not as sharply peaked as graphs A2 and B2 so that a camera having its photodetectors spaced relatively far from the scintillator would be able to produce an image of an array of equally spaced apart scintillations as an image of equally spaced apart image points. However, it is noted that the graphs A1 and B1 greatly overlap with little variation and magnitude of detector signal in the region between the detector axes 50. Thus, it is seen that the differences in response of the photodetector to scintillations which are relatively closely spaced is small with the result that a camera utilizing photodetectors spaced relatively far from the scintillator cannot readily distinguish between two closely spaced scintillations. Thus, the resolution for the graphs A1 and B1 is relatively low.

With respect to the graphs A3 and B3 representing a camera constructed in accordance with the invention, it is seen that there is a great difference in the magnitude of the detector signal for scintillations which are relatively closely spaced so that a camera employing the invention is able to distinguish between closely spaced scintillations; accordingly, there is high resolution. Furthermore, as has been described with reference to FIG. 6, the shapes of the peak portions of the graphs A3 and B3 provide linearity to the summation of the graphs. As a result, the image of uniformly spaced apart scintillations appears as an array of uniformly spaced apart image points. Thus, a camera constructed in accordance with the invention has both high resolution and high linearity.

Figure 7:
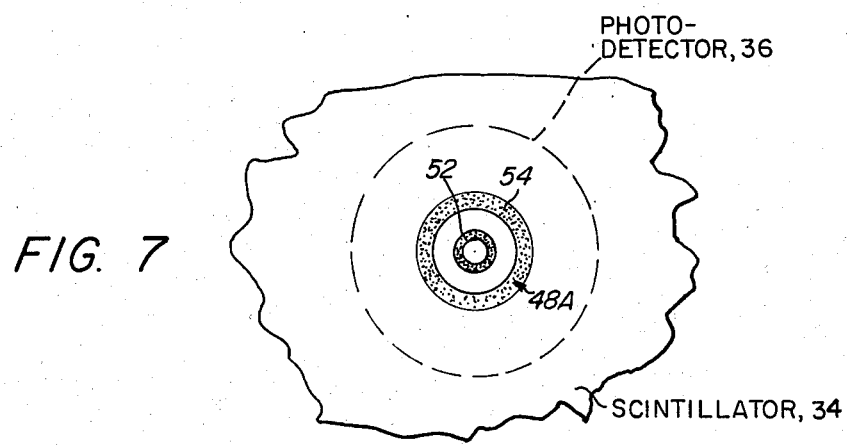
FIG. 7 is an alternate embodiment of the mask showing a double ring configuration.

Referring now to FIG. 7, there is shown an alternative embodiment of the mask 48 of FIG. 2, this mask being identified by the legend 48A and is seen to comprise a plurality of concentric annular sections, the outer annulus being wider than the inner annulus. The mask 48A of FIG. 7 provides greater flexibility than the mask 48 of FIG. 2 in tailoring the shape of the response graph of FIGS. 4 and 5 of a photodetector 36. For example, it may be seen that if a nonreflective coating were applied on the scintillator at a point directly on the axis of a photodetector, then the response graph would have a slight dip at the peak of the graph with a resultant broadening of the peak portion of the graph.

Figure 8:
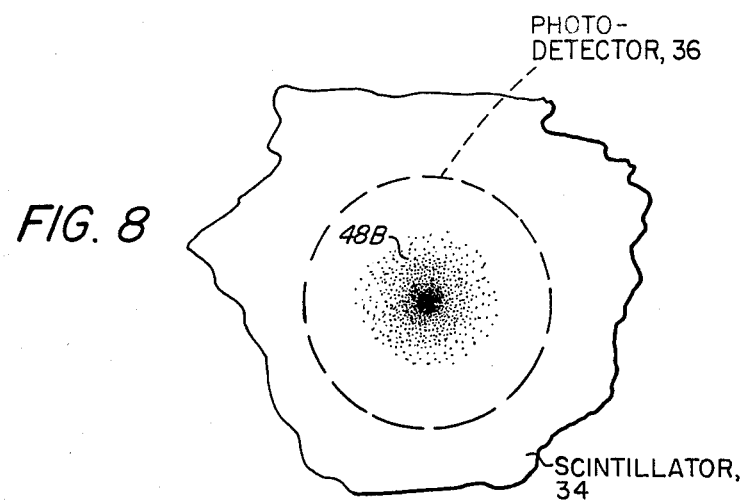
FIG. 8 is an alternative embodiment of the mask employing a pseudorandom pattern with radially decreasing density of the coated areas.

FIG. 8 shows yet another embodiment of the mask 48 of FIG. 2, this embodiment being identified by the legend 48B. The mask 48B shows a random application of small dots of the nonreflective coating in which the dots of nonreflective coating are applied to the scintillator 34 more densely in the region of the detector axis. This may be done by a process of sputtering a nonreflective coating, which may be, for example, a black paint which adheres to a sodium iodide crystal, as by the use of an air brush, with the application of the paint being repeated more often in the region of the detector axis. Accordingly, this format of the mask is referred to as a pseudorandom mask since the density of the random pattern varies inversely with the radial distance from the detector axis.

Figure 9:
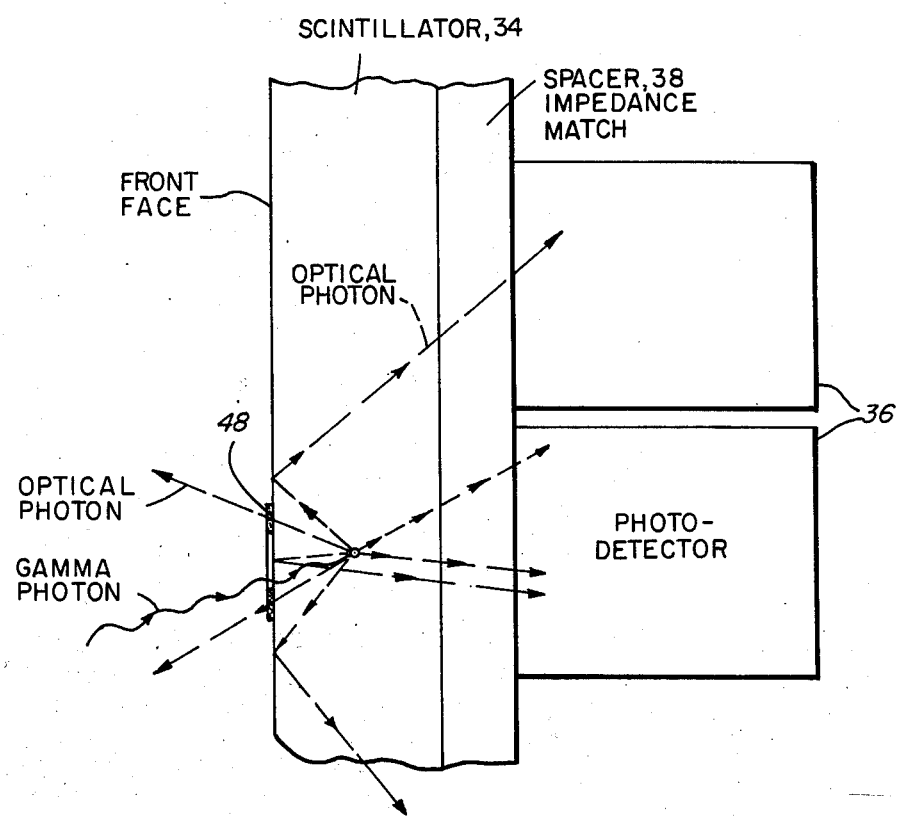
FIG. 9 shows a side view of a portion of a scintillator including an incident gamma photon and the internal reflection of resulting optical photons.

Referring now to FIG. 9, a side view of a portion of the scintillator 34 depicts the optical photons emitted from a point of impact of a gamma photon within the scintillator 34. The Figure shows the internal reflection of optical photons from the front face of the scintillator 34 which directs the optical photons back towards a photodetector 36. The mask 48 alters the boundary condition of the front face so that an optical photon impinging upon an area masked with the nonreflective coating continues in the same general direction without being internally reflected. The optical photon either propagates through the coating of the mask 48 or is absorbed therein depending on the degree of opacity of the coating. In particular, it is seen that the internal reflections of the optical photons play a large role in determining the total amount of photon energy incident upon the photodetector 36, this, in turn, producing an output signal of a photodetector 36 with its accompanying pulse shaper 42 (of FIG. 1) which has a magnitude representative of the total energy of the photons incident upon the photodetector 36. By altering the amount of internal reflection and by designating the regions of strong and weak internal reflection of means of the mask 48, or the alternative embodiments thereof, the detector response graph of FIGS. 4 and 5 can be altered to provide the aforementioned high resolution capability and high linearity capability to a radiographic camera.

It is noted that in securing the mask to the scintillation crystal, the mask is secured directly to the material of the crystal. For example, a scintillator is frequently made of a sodium iodide crystal which is hygroscopic. Thus, it cannot be exposed to the atmosphere and can, in practice, be formed in an inert nitrogen atmosphere. The crystal is enclosed with a housing of, typically, aluminum with a glass window, within the nitrogen atmosphere so that no water vapor can contact the crystal with the resulting adsorption of the water vapor into the crystal and degradation of the crystal properties. Accordingly, the nonreflective coating disclosed herein is applied within an enclosure which encloses the crystal in the aforementioned nitrogen atmosphere; thereafter, the coated crystal is enclosed within the protective casing of aluminum and glass. The glass portion is typically formed from a rigid, temperature insensitive stable glass such as that available commercially under the name Pyrex.

In the situation where the camera 20 comprises a scintillator having a transmissive front face wherein there is substantially no internal reflection, a mask having a pattern complimentary to one of those disclosed in FIGS. 2, 7 and 8 is utilized. For example, a reflective coating would be applied to the front face of the scintillator of FIG. 7 except at the two annular regions 52 and 54, or, in the case of FIG. 2, the reflective coating would not be applied to the single annulus of the mask. The resulting pattern of internal reflection, as shown in FIG. 9, would thus be the same for scintillators having transmissive faces for the previously described situation of the reflectant face.

It is also noted that, in addition to the use of reflective and nonreflective coatings, the masking can also be accomplished by abrading, etching or polishing which vary the amount of internal reflection and transmissivity at the face of the scintillator. For example, where etching is to be employed, a stencil having the mask pattern covers the face so that the prescribed mask region is etched.

It is understood that the above described embodiments of the invention are illustrative only and that modifications thereof may occur to those skilled in the art. Accordingly, it is desired that this invention is not to be limited to the embodiments described herein but is to be limited only as defined by the appended claims.

What is claimed is:

1. A radiographic camera comprising:
   a scintillator;
   a plurality of photodetectors positioned to face said scintillator;
   a plurality of nonreflective mask regions formed upon the front face of said scintillator opposite said photodetectors and positioned coaxially with respective ones of said photodetectors for decreasing the amount of internal reflection of optical photons generated within said scintillator, an individual one of said mask regions being in line with an axis of an individual one of said photodetectors.

2. A camera according to claim 1 wherein said masked regions have axial symmetry about the axes of corrresponding ones of said photodetectors.

3. A camera according to claim 2 wherein said masked regions have greater opacity to optical photons than does the material of said scintillator.

4. A camera according to claim 3 further comprising resistive summing means for weighting and summing together the signals produced by individual ones of said photodetectors in response to radiation incident upon said scintillator.

5. A camera according to claim 1 further comprising resistive summing means for weighting and combining individual ones of the signals produced by said photodetectors in response to radiation incident upon said scintillator.

6. A camera according to claim 1 wherein said masked region has the form of an annulus.

7. A camera according to claim 1 wherein said masked region has the form of a plurality of concentric annuli.

8. A camera according to claim 1 wherein said masked region has a pseudorandom distribution of coated spots, the density of said spots decreasing inversely with radial distance from an axis of one of said photodetectors.

* * * * *